Patented Jan. 6, 1948

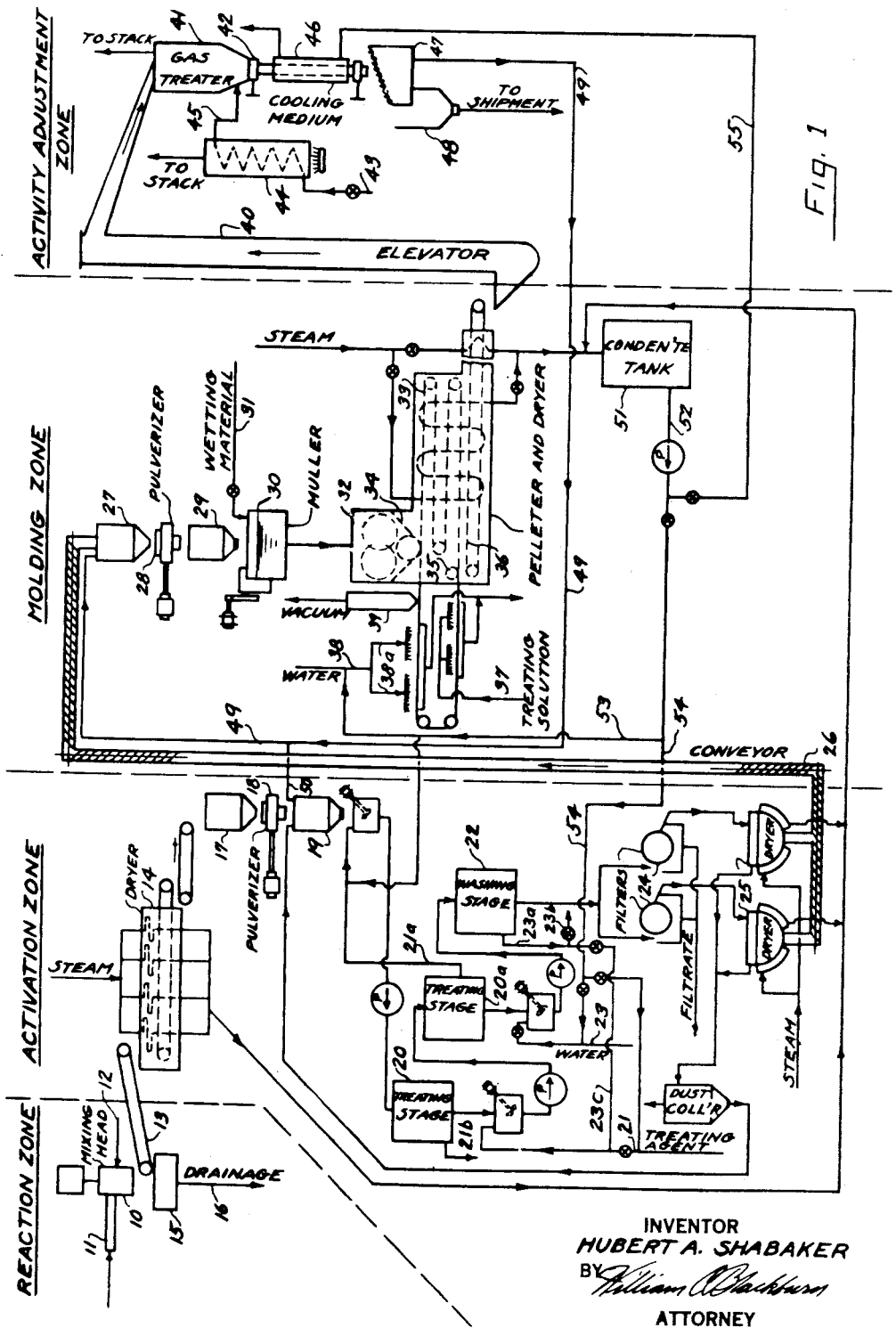

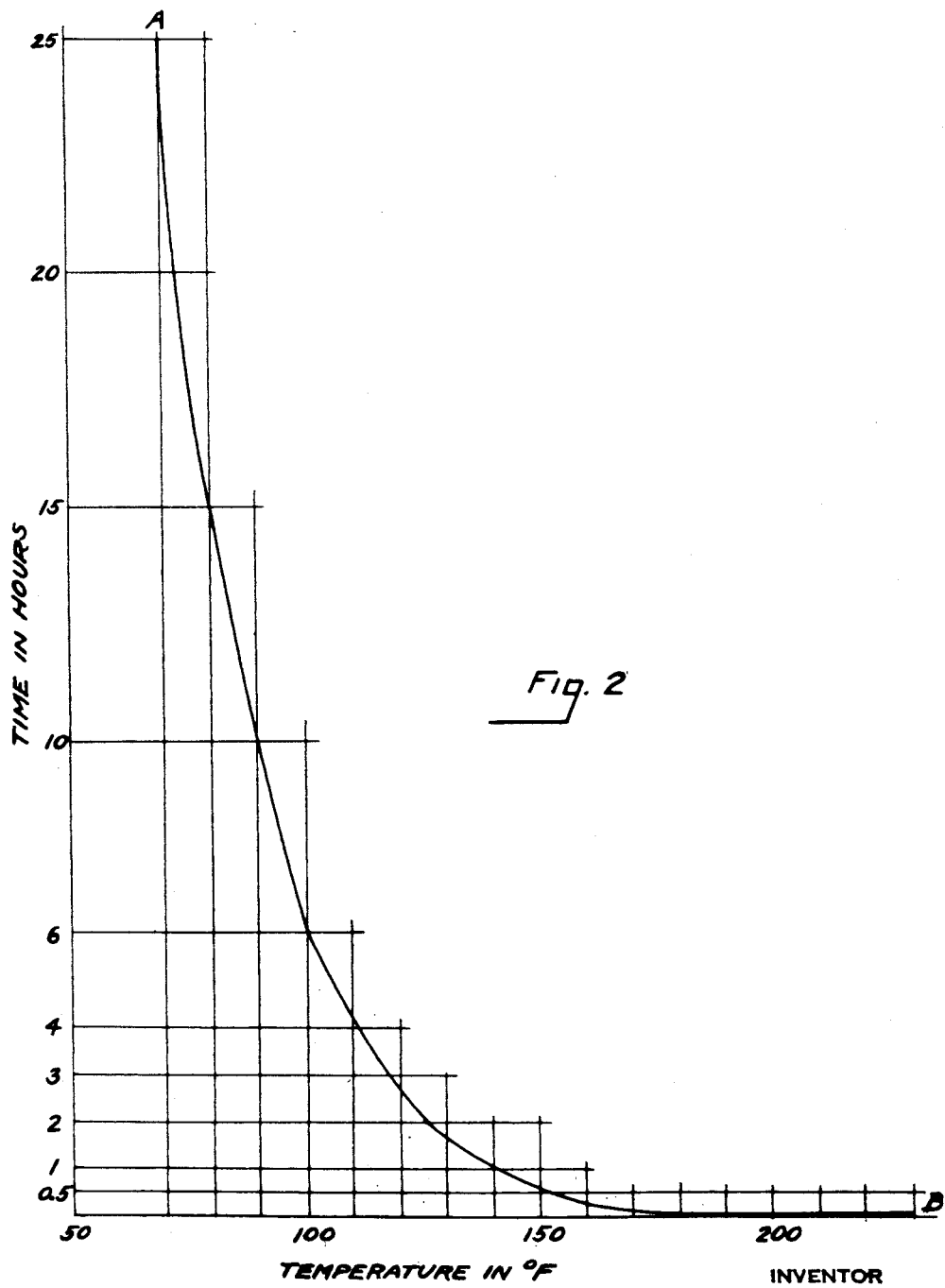

2,433,869

UNITED STATES PATENT OFFICE 2,433,869

PREPARATION OF CONTACT MASSES

Hubert A. Shabaker, Media, Pa., assignor to Houdry Process Corporation, Wilmington, Del., a corporation of Delaware Application March 9, 1944, Serial No. 525,666

2 Claims. (Cl. 252—259.2)

1

The present invention relates to the production of contact masses valuable for use in promoting, entering into, or in any way assisting chemical processes, or as support for catalysts, promoters or other active substances which influence chemical or other reactions. It deals in particular with inexpensive and economical processes for treating inorganic gelatinous substances to produce porous adsorptive catalytic materials and also for converting such materials into hard, rigid, strong molded units of predetermined size and shape.

Heretofore, attempts to produce molded contact masses of high strength from synthetic materials, for example, gels, gelatinous precipitates and the like, have met with limited commercial success. Gels or gelatinous precipitates are, because of their gelatinous or jelly-like texture, ill-suited for economical treatment or handling to produce adsorptive catalytic materials and due to their tendency to shrink greatly on drying they are not adapted to commercially feasible continuous processes for producing strong molded units. After they have been converted to dry, hardened and preferably granulated, comminuted or finely divided form, they are easily and cheaply purified, but in this condition they have little or no plasticity and it is necessary in order to make them suitable for simple molding operations to add a plastic material or other binding agent. In many instances, use of binding or plasticizing agents so modifies the porosity, activity, reactivity or other desired properties of the material as to reduce its value as a catalyst. When it has been necessary or desirable to utilize little or no binder, molding methods involving stamping, extreme pressure, and/or impact have been utilized, but such methods are costly. Moreover, hard, abrasive materials of the nature of dry vitreous gels tend to cause excessive wear in machines designed to effect this type of molding.

One object of the invention is to provide methods for producing continuously contact material suitable for commercial use from solutions of starting materials or reactants. Another object is to produce from gels or gel-like substances solid contact material having stability of activity. Another object is directed to the economical and efficient processing of wet gels or gelatinous precipitates to produce porous, stable bodies of contact material on a commercial scale. Another object is directed to an economical process for effecting rapid and efficient removal of water and impurities from a gel or gel-like material. Other objects will become apparent from the detailed description which follows.

2

The invention involves a particular sequence of steps for treating a gel or gel-like substance which is produced by interacting a plurality of reactants, for example, aqueous solutions capable of producing inorganic gels or gelatinous precipitates containing one or more oxides or hydroxides. The gel or gel-like substance is produced under conditions or is maintained or treated under conditions directly after its production in order to permit the substance to be dried economically and rapidly so that the substance attains the physical state which is necessary to place it in condition for further processing. This invention has special application to plural oxide catalysts of the silicious type.

The conditions under which the gel substance is formed or under which it is maintained after its formation, in addition to providing for rapid and economical drying, also lowers the gravity of the final product, provides a catalyst having stability of activity as indicated by its ability to resist loss of activity on contact with steam at elevated temperatures and gives to the material the necessary characteristics for producing readily molded or cast products which are highly porous and have the necessary strength and hardness to withstand long periods of commercial use. Due to the preliminary treatment of the gels the drying can be effected under fairly moderate temperature conditions and for a relatively short period of time to produce a friable or flaky material. The material in this physical state permits a rapid and effective removal of impurities therefrom which would adversely affect the activity or the molding characteristics of the final product. After removal of impurities from the material it is then further treated in a manner to change it to such a plastic state that it is readily deliverable to molds and formed into rigid products which are further treated for the purpose of adjusting the activity and increasing the hardness of the products.

In the drawings, Fig. 1 is a flow sheet of a commercial plant in which the indicated operations are arranged in four stages, and Fig. 2 is a graph of aging conditions in accord with this invention.

Referring to Fig. 1 of the drawings, the mixing device 10 wherein the gel is formed receives streams of reactant solutions for forming the gel from lines 11 and 12. The mixer 10 may be a single or multiple stage reactor and will preferably take the form of any of those disclosed in my copending application Serial No. 398,731, filed June 19, 1941, now U. S. Patent No. 2,370,200, issued February 22, 1945 for Production of solids from reactant solutions, or of the type disclosed in Patent No. 2,232,727, issued to A. G. Peterkin and myself February 25, 1941. These reactors are designed to provide a confined chamber with the inlets for the reactant solutions communicating therewith in a manner to provide conditions of great turbulence within the chamber so that the gel formation is substantially instantaneous within the chamber. The reactant solutions are fed to the mixing device 10 continuously and the formed gel is continuously removed therefrom and fed to a conveyor 13 through which the gel is removed from the reaction zone to the reactivation zone and distributed on a dryer generally indicated at 14, wherein the second or activation stage of the process is begun. In order to increase the surface area of the gel so that greater surface is subjected to the drying medium, the gel is subdivided prior to being delivered to the dryer 14 by any suitable means.

A substantial portion of the water content of the gel is removed before it reaches the drier 14 by arranging conveyor belt 13 to incline upwardly to permit water to drain therefrom. Provision is made to age the gel before it reaches the drier in order that the final product has activity stability as well as physical stability. The aging may be accomplished in several ways and preferably is done while the gel travels up the belt 13 to the drier and for a period preferably sufficiently long for syneresis to occur so that the syneresis water can drain from the belt into a sump 15 from which it can be removed through line 16. The conditions under which the aging is carried out are such that there is substantially no water removal by evaporation. Only the water of syneresis is removed during this step, which permits the drying step, wherein a substantial portion of the water remaining in the gel is removed by evaporation, to be effected rapidly and economically. As mentioned above, the aging of the gel may be carried out in various ways, such for example, as disclosed in the copending application of J. R. Bates and myself, Serial No. 427,918, filed January 23, 1942 (issued December 24, 1946 as U. S. Patent No. 2,412,958), wherein the gel undergoes a fast aging step in which it is subjected to a mixture of steam and air at about 175° F. for approximately one-half hour. Or the gel may be rapidly aged in various other ways, for example, by immersion in a hot liquid such as water or oil maintained between 150 and 250° F. for about two hours or less, or the reactant solutions may be delivered to the mixing device at elevated temperatures, for example, around 160° F. and the gel maintained at about that temperature after its formation until it is delivered to the drier. Products of good activity, stability and physical characteristics have also been obtained by slow aging the gel at low temperatures, such as room temperature, for extended periods of time, from 24 to 48 hours.

Fig. 2 discloses aging conditions in accord with the present invention. The aging is effected at a temperature above 70° F. and for a time of at least 5 minutes. The time and temperature of aging are correlated to lie above and to the right of the line AB in this figure. For definiteness with respect to the position of the line AB it is noted that it passes through 0.25 hour at 160° F. and is at 0.083 hour (5 minutes) at 210° F. When produced under these conditions catalytic gels are obtained by drying and purifying of soluble materials, the catalytic properties of which are relatively stable with respect to materials which are not so aged. When the gels are formed into agglomerated pellets the pellets are relatively extremely hard in comparison to pellets not so aged.

After the gel has been aged and the syneresis water drained therefrom, it is delivered to the drier 14 where, due to the removal of the syneresis water during the aging, it may then be dried rapidly even at moderate or low temperatures, for example, below 500° F. In practice it has been found that efficient drying is had when the gel is subjected to low temperatures between 150 to 200° F. at the beginning of the drying zone and then subjected to progressively increasing temperatures until at the end of the drying zone the material is dried at between 250 and 400° F.

As the gel substance passes through the drier 14 a large amount of water is evaporated therefrom, for example, about 10 lbs. of water would be evaporated to produce 1 lb. of final product. When the material reaches the end of the drier 14 it is in a friable or flaky state and sufficient water has been removed therefrom to prevent the material in this condition from going into solution or reverting to the gel state upon the addition of water in the further treatment of the material.

In the dried condition any impurities may readily be removed from the gel by water washing or chemical treatment and it is essential that the step of removing impurities be conducted prior to delivering the material to the activity adjusting zone. The degree of fineness of the material as it leaves the drier 14 will determine the particular operating conditions for removing the impurities therefrom. It has been found in practice that generally the best procedure is to pulverize the material before treating it to remove impurities. To this end, the material from drier 14 is discharged into hopper 17 for delivery into suitable granulating or pulverizing equipment indicated at 18, from which it is removed in pulverized condition to a second hopper 19 prior to undergoing the impurity removing treatment. The impurity removing operation may comprise various forms of apparatus elements and preferably the elements will be arranged so that a continuous washing or chemical treating operation is effected. As indicated, the pulverized substance will be directed from hopper 19 to one or more treating vessels 20 and 20a, which may be arranged in cascade, and therein the pulverized material is contacted with a selected treating agent which is supplied by line 21, first to vessel 20a. The partially spent treating agent is conducted from vessel 20a to vessel 20 by line 21a, and the spent agent after contact with untreated gel in the last named vessel is discharged from the system by line 21b. The gel material in the treating vessels 20 and 20a is a slurry and may be treated with chemicals, such as acids, alkalis or salts, or washed with water or with any combination of these. It is then pumped to vessel 22 where it is advantageous to wash the treated substance with a pure wash water, such as distilled water, which may be supplied to vessel 22 by line 23. The used wash water, removed from vessel 22 through line 23a, is discharged from the system through line 23b. If desired, the used wash water from vessel 22 may be conducted from line 23a through line 23c to line 21 and used as an ingredient for treating the substance in treating vessels 20 and 20a.

After the material has been treated or washed and sufficient impurities removed therefrom it is necessary that the treating or washing liquids, or a portion thereof, be removed from the material in order to place the material in a physical state which is suitable for commercial use. The material from the washing stage is then directed to filters 24 where, after sufficient liquid is removed therefrom, the finely divided filtered material may be removed from the filters and used as a catalytic material, or it may be sent to driers 25 for further water removal if necessary. The driers 25 may, as indicated, be provided with suitable dust collectors and the collected particles returned to a suitable point in the system, such as hopper 19.

It is at times advantageous if the substance leaving the drier 14 is ground or pulverized prior to the washing step, since for some unexplainable reason the filtering characteristics of the material are greatly increased. For example, if the material is treated directly from the drier to remove impurities the cake formed during the filtering step is exceedingly thin, as of the order of $\frac{1}{16}''$ in thickness, while if it is pulverized or granulated directly from the drier and then treated to remove impurities, the filter cake attains a thickness upwardly of 2'' which is a considerable advantage in large commercial operations.

As heretofore mentioned, the material, after filtering or drying operations, is then in condition for use as a contact material or catalyst, since it is then in the pure state, or contains only a negligible amount of components which would be deleterious to chemical processes and the various treatments following the gel formation, particularly the aging step, has given to the material stability of its catalytic activity. The various treatments which the gel has undergone after its formation have additionally given to the material other characteristics, for example, the ability of the particles of the material to adhere to each other resulting in physical strength in molded agglomerates. After leaving the activation zone the material is in excellent condition for molding into units of desired size and shape and the material may be directed by conveyor 26 to hopper 27 in the molding zone from which it is delivered to a pulverizer 28 where it is ground or subdivided to a degree of fineness of 100 to 200 mesh in order to condition it to be placed in a somewhat plastic state by further treatment so as to provide a readily moldable substance. From the pulverizer 28 the material is led to a mulling or kneading zone 30 through a feed hopper 29. A controlled amount of water or other liquid is added to the material in zone 30 through line 31, for example, and the gel is subjected to vigorous mechanical treatment in order to thoroughly work the liquid into the dried gel particles and develop a heterogeneous paste.

The material leaving the activation zone may be formed into a paste in various ways, for example, the liquid may be supplied directly from any source through line 31, or the liquid may comprise the spent wash material from the activation zone. An efficient commercial operation has been conducted by drying or filtering only a portion of the washed material in the activation zone and adding to this dried portion another portion of material directly from the washing stage sufficient in amount to give desired plasticity to the material in the mulling zone 30.

The quantity of liquid utilized is regulated to produce a substantially constant composition of moldable consistency though the quantity required will vary between wide limits, depending upon the physical characteristics of the material leaving the activation zone. Generally the quantity of wetting material required will be within the range of 30 to 150% by weight of the filtered gel in order to provide a paste having a consistency capable of being flowed into casting molds. As disclosed in my Patent No. 2,299,768, issued October 27, 1942, the mulling or kneading treatment in zone 30 may be such as to provide a heterogeneous paste which sets to solid form upon standing and reverts to moldable consistency upon being agitated.

One molding operation particularly well adapted for continuous production of large quantities of molded product is one in which the moldable material is flowed into casting dies or molds, converted to hard form in the dies and ejected or otherwise remove from the dies in that condition. As shown diagrammatically in the pelleting machine indicated generally at 32 the casting dies or molds are preferably arranged in a continuous belt 33 which travels first through a loading zone containing a suitable device 34 for receiving moldable mixture from kneader or muller 30 and applying it to the molds, then through a hardening or setting zone wherein the cast material is alowed to set or harden or is treated to effect this result, and then through an unloading zone containing suitable means, indicated at 35, arranged and adapted to remove the hardened material from the molds as by pushing or punching action, by blowing with jets of air and/or by vibration of belt 33. The hardening of the molded material, especially if it be a thixotropic mixture, may consist in allowing sufficient time for it to set to hard form. In most cases, a better product is obtained when the molded units are dried by passage once or any desired number of times through a heated hardening zone whose temperature may be maintained at a level similar to or higher than that employed in dryer 14, by suitable heating elements, for example, pipe coils heated by steam. If desired, the molded units or pellets after ejection from belt 33, may be subjected to further hardening in the heating zone as by passage through that zone on conveyor belt 36, as shown.

The molds in belt 33 are preferably treated to remove adherent particles of gel and the like and/or to lubricate the walls of the casting cups or perforations, before their return to loading position. To this end, they may be subjected to treatment with a solution of alkali, acid or salt or other material capable of dissolving the adherent solid supplied by line 37 and spray nozzles 37a, followed by washing with water and/or a lubricant supplied by line 38 and sprays 38a. The molds may have excess liquor removed therefrom after either or both washing steps, for example, by heating or drying or by use of a vacuum jet, such as indicated digrammatically at 39.

The fourth stage of the process as indicated involves treatment of the molded product to adjust its adsorptive capacity or catalytic or chemical activity and to improve its value for its intended use, for example, to improve its ability to assist desired reaction and/or to reduce its tendency to produce formation of by-products. The adjustment may involve chemical or physical treatment of the mass at controlled temperature with active or inert fluids for the purpose of activating, deactivating, modifying or removing certain components thereof, as for example, by reduction or oxidation, or by treatment with inert or chemically active fluids which selectively control or modify activity of any or all of the components or constituents of the molded products.

One type of treatment valuable for controlling the activity of many contact masses having a great variety of uses and indicated diagrammatically in Fig. 1, involves heating the mass in the presence of suitable inert or active gaseous medium, such as air, steam, flue gases, halides, ammonia and the like. The molded material conveyed from pelleter 32 as by elevator 40 to the activity adjusting zone is led to suitably heated gas treater 41, wherein the pellets flow downwardly at a rate regulated by discharge valve 42, or by other suitable means, countercurrent to a stream of suitable gaseous treating medium supplied by line 43 heated to desired temperature in coil heater 44 and flowed by line 45 to treater 41. One advantageous gas treatment of plural component contact masses comprising or containing one or more oxides from the group silica, alumina, zirconia, beryllia, for example, and intended for use in the treatment or transformation of hydrocarbons and their derivatives, is, as disclosed in the copending application of John R. Bates, Serial No. 289,915, filed August 12, 1939, now abandoned, to subject the molded material to an atmosphere containing up to 100% of steam at controlled temperature within or above the range of 600 to 1600° F., as for example at 800 to 1400° F. for suitable periods of time up to several hours.

The discharge of molded material from treater 41, after cooling in cooler 46, is screened by sieve 47 to remove the small quantity of fines that may have accumulated in the molding, drying and activity adjustment steps. The finished pellets of desired size fall into hopper 48 from which they may be removed as required or desired for bagging or other packing for shipment. The fines passing through the screen may be returned to an intermediate stage of the process for reworking, in which event they may be added by line 49 to the pulverized material flowing into the molding zone, or may be led by lines 49 and 50 to the finely divided gel entering the treating or washing stages in the activation zone. If desired, sieve 47 may be supplemented or replaced by a sieve disposed before the gas treater, the fines from which may be reworked as described in connection with sieve 47.

The purified material from the filters 24 or dryers 25 may be treated directly in the activity adjusting zone without undergoing treatment in the molding zone since, as heretofore pointed out, the material leaves the activation zone in condition for immediate use for some contacting operations. The apparatus heretofore described in connection with the activity adjusting zone, although adapted for molded or pelleted material, can readily be adapted for handling the fine granular material from the activation zone in order to provide the proper activity adjustment.

When steam is used as a heating medium for conducting drying processes, for example in dryer 14 and/or in pelleting machine 32, the condensed water produced in the drying coils may be utilized as a source of purified water for assisting in one or more of the steps of processing or making a gel. To this end, the condensate may be collected in a suitable tank 51 from which it may be withdrawn by line 52 as desired or required and forced through line 53 into line 38 for use in washing the casting molds and/or through line 54 to either or both lines 23 and 21 for use in the treating solution utilized in treating zones 20 and 20a. Suitable quantities of the condensate may be utilized in the preparation of the reactant solution fed to lines 11 and 12. Any excess condensate may be conducted through line 55 to be utilized as a cooling medium in cooler 46.

Hardening of the molded units is effected by passage of the belt 33 through a heated zone maintained at temperatures sufficiently high to drive off part or all of the moisture and harden the molded units. It is preferred to employ low or moderate temperatures for this step, as for example, up to 500° F. However, any desired temperature below the fusion point of the molded mass, for example, up to 1600° F., as within the range of 900° F. to 1400° F., may be utilized, especially in instances where high temperature does not impair the product or interfere with any subsequent treatment.

One typical application of the invention is in the production of molded catalysts of predetermined activity consisting essentially of silica and alumina. A gel was continuously prepared in the reaction zone in a mixer, having a cylindrical reaction chamber and discharge nozzle of about 2½ inches in diameter and a length of about 4½ inches, by coagulating a stream of silica-alumina sol with a stream of a solution of a salt containing a volatile cation after the manner disclosed in Patent No. 2,283,173, issued to John R. Bates, May 19, 1942. The sol was made by feeding to the mixer at pressure above 10 lbs./sq. in. gauge, 122 volumes of sodium silicate solution and about 170 volumes of sodium aluminate solution, the sodium silicate being made by diluting about 105 parts by weight of a commercial sodium silicate containing about 28.8% silica with about 45 parts by weight of water, and the aluminate solution by dissolving about 27 parts by weight of solid commercial sodium aluminate of about 55% alumina content in about 170 parts by weight of water. About 97 volumes of ammonium sulphate solution, made by dissolving approximately 27 parts by weight of solid ammonium sulphate in about 83 parts by weight of water, was injected in the form of several high velocity jets into the stream of silica alumina sol traversing the reaction chamber. The rapidly gelling mixture was immediately violently agitated for about 0.1 second by a rapidly rotating mixing blade and the resulting completely formed zeolitic gel which had a pH of about 9.6 and which contained about 9% by weight of water insoluble oxides flowed from the mixer as a stiff, continuous body which contained or embraced all the constituents of the streams of sodium silicate, sodium aluminate and ammonium sulphate solutions. The rate of flow of these streams into and through the reaction chamber was such that only about 0.4 second elapsed between the mixing of the sol and ammonium sulphate solution and the ejection of the all embracing gel from the mixing head. At intervals of about one to three hours, the flow was transferred from one mixer to another for the purpose of removing accumulated gel.

The stream of gel was continuously collected on an inclined conveyer on which the process of aging was allowed to proceed while the gel was simultaneously heated to about 150° F. The conveyer discharged the material through a 3 mesh screen granulator on to a continuous drier in the activation zone operated at about 200° F. The resulting hard, vitreous zeolitic solid was ground to 100 mesh size and finer and was then subjected to continuous counter-current washing and base exchange treatment with a solution of ammonium chloride until an ammonium zeolite containing less than about 0.5% by weight of sodium oxide was produced.

After water washing, filtering and drying, the ammonium zeolite was mixed with an approximately equal weight of water and subjected to vigorous kneading and mulling action for about 30 minutes in the molding zone. The heterogeneous and comparatively thin thixotropic paste so produced was formed into a continuous sheet which was flowed without the use of substantial pressure into perforations of about 4.5 mm. diameter extending entirely through continuously moving casting plates of about 4 mm. thickness which formed the molding belt. Then the cast material was dried in the moving plates at temperatures of about 300° F. whereupon the hardened pellets were ejected from the plates and were then treated for about 10 hours while being maintained above 1000° F. with a moving stream of steam.

From the above described quantities of reactant solutions fed to the mixer the plant continuously produced the finished pellets at the rate of about 60,000,000 per day. These pellets were capable of uniformly withstanding concentrated loads in excess of 1,000 grams applied across their axes through a knife edge of the type commonly used for analytical balances, and consisting of the substantially pure silica-alumina nucleus of the zeolite. They were highly adsorptive and were valuable for use in contact processes involving selective adsorption of fluids, for example, to separate desired gases from gaseous mixtures or as a filtering or decolorizing medium for removing unstable and color bodies from syrups or oils. Also they were valuable for catalyst or catalyst support for promoting decompositions including dehydrogenation and splitting reactions and for promoting synthesis including reactions involving polymerization, alkylation and condensation reactions. Also, these silica-alumina pellets were valuable for use to effect, promote, or as support for metals or oxides which promote or effect desulphurization and other purification of hydrocarbon gases and liquids, coke oven gas and the like. When used in processes involving periodic regeneration to remove carbonaceous, sulphurous or other deposit by combustion or extraction they were capable of retaining their size and shape, catalytic activity and/or adsorptive capacity for prolonged periods of use in which they were subjected to repeated and frequent regeneration.

Following is a chart showing various conditions of treating a gel and the characteristics of the product obtained. In the production of the catalyst the gel was aged as disclosed in the specification in order to provide for fast and economical drying.

| Aging Conditions | | Apparent Density | Hardness, Grams | Activity Per Cent Gaso. | Stability | |
|---|---|---|---|---|---|---|
| Hours | Temp., °F. | | | | Hardness | Activity Per Cent Gaso. |
| 24 | 70 | .62 | 2,400 | 49.3 | 2,700 | 34.9 |
| 48 | 70 | .64 | 7,100 | 47.3 | 6,100 | 33.8 |
| 0.5 | 175 | .58 | 6,600 | 45.6 | 6,800 | 33.2 |

Each of the three catalysts was pelleted. The hardness of the pellets, 4 mm. in diameter and of cylindrical shape, was measured by placing a weighted knife edge of the type used in analytical balances upon the cylindrical surface of the pellet perpendicular to the axis. The weight on the knife edge was increased until the pellet broke and the last reading, just prior to breakage of the pellet, was taken as the measure of hardness. The activity of the three catalysts was adjusted prior to the activity measurement by treating for 10 hours at 1400° F. in a mixture of 5 mol percent steam and 95 mol percent air. The catalysts were tested for steam stability with respect to hardness and activity by treating them for four hours at 1350° F. in 100% steam. The activity of the catalyst initially and after steam aging was determined by measuring the percent by volume of the gasoline based on initial charge stock produced during cracking run in which a light East Texas gas oil was charged to the catalyst at atmospheric pressure, the catalyst being maintained at 800° F. at a rate of 1½ liquid volumes of gas oil per volume of catalyst per hour for a ten minute period.

When a gel produced by the above described typical method had not been aged but was dried and treated to adjust activity under the conditions of the typical method it was noted that the apparent density was high, of the order of .7. The hardness was extremely low, of the order of 400 grams, and the activity stability was low, of the order of about 20%.

Similar improvements are obtained by the present process with other contact masses, as for example, with catalysts containing a major proportion of silica and minor proportions of alumina, zirconia and beryllia. Also improved catalysts are obtained by this process containing silica and any one or two of the materials alumina, zirconia and beryllia.

Although the invention has been described in connection with one typical operation, it is to be understood as exemplary only and not limitative of the invention which is to be limited only by the appended claims.

The present application is a continuation-in-part of application Serial No. 349,794, filed August 2, 1940, now abandoned.

I claim as my invention:

1. The method of producing a catalyst in the form of hard, low-density pellets highly stable to deactivation by steam, which comprises preparing a plural inorganic hydrogel comprising a hydrous oxide of silica, said hydrogel containing alkali metal salts as an impurity, aging said hydrogel in freshly prepared state without intermediate treatment following its preparation and at a temperature of at least 70° F. and for a time of at least 5 minutes, the temperature and time being correlated to lie above and to the right of the line AB in the accompanying drawing, rapidly drying the aged hydrogel, pulverizing the thus obtained dried gel, washing and treating the pulverized gel to remove alkali metal salts, filtering the washed gel then again drying the same, forming the dried gel into paste with the addition of water, casting the paste into pellets, drying and calcining the pellets.

2. The method of producing silica-alumina catalyst in the form of hard, low-density pellets highly stable to deactivation by steam, which comprises preparing a hydrogel comprising hydrous oxides of silica and alumina, said hydrogel containing alkali metal salt as an impurity, aging said hydrogel in freshly prepared state without intermediate treatment following its preparation and at a temperature of at least 70° F. and for a time of at least 5 minutes, the temperature and time being correlated to lie above and to the right of the line AB in the accompanying drawing, rapidly drying the aged hydrogel, pulverizing the thus obtained dried gel, washing and treating the pulverized gel to remove alkali metal salts, filtering the washed gel then again drying the same, forming the dried gel into paste with the addition of water, casting the paste into pellets, drying and calcining the pellets.

HUBERT A. SHABAKER.

REFERENCES CITED

The following references are of record in the file of this patent:

UNITED STATES PATENTS

| Number | Name | Date |
|---|---|---|
| 1,762,228 | Holmes | June 10, 1930 |
| 1,772,055 | Miller | Aug. 5, 1930 |
| 1,893,812 | Weil | Jan. 10, 1933 |
| 1,998,219 | Brown | Apr. 16, 1935 |
| 1,584,716 | Behrman | May 18, 1926 |
| 2,146,718 | Bond | Feb. 14, 1939 |
| 2,326,523 | Connolly et al. | Aug. 10, 1943 |
| 2,299,768 | Shabaker | Oct. 27, 1942 |
| 2,340,935 | Connolly | Feb. 8, 1944 |
| 1,592,543 | Stewart | July 13, 1926 |